United States Patent Office

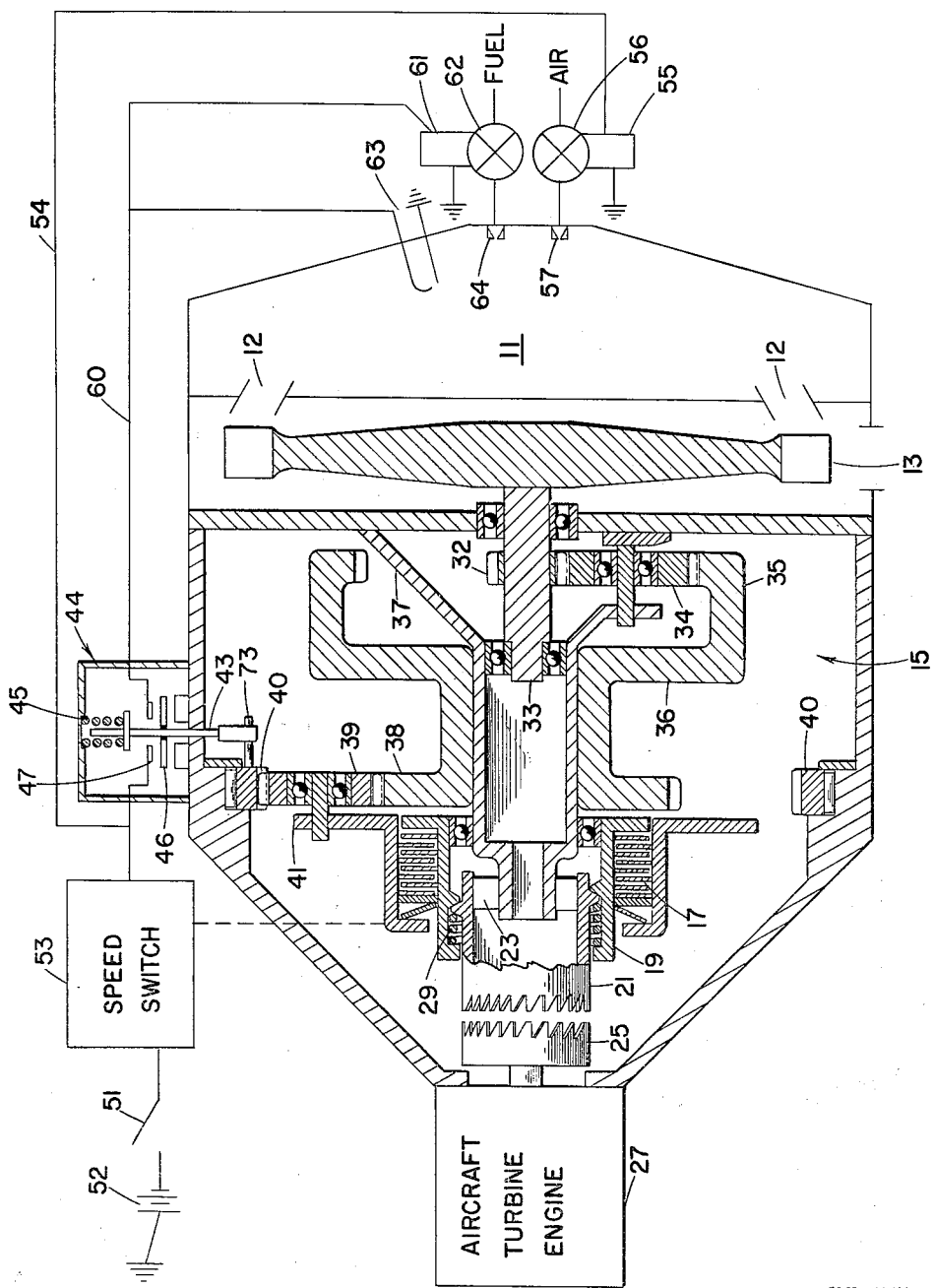

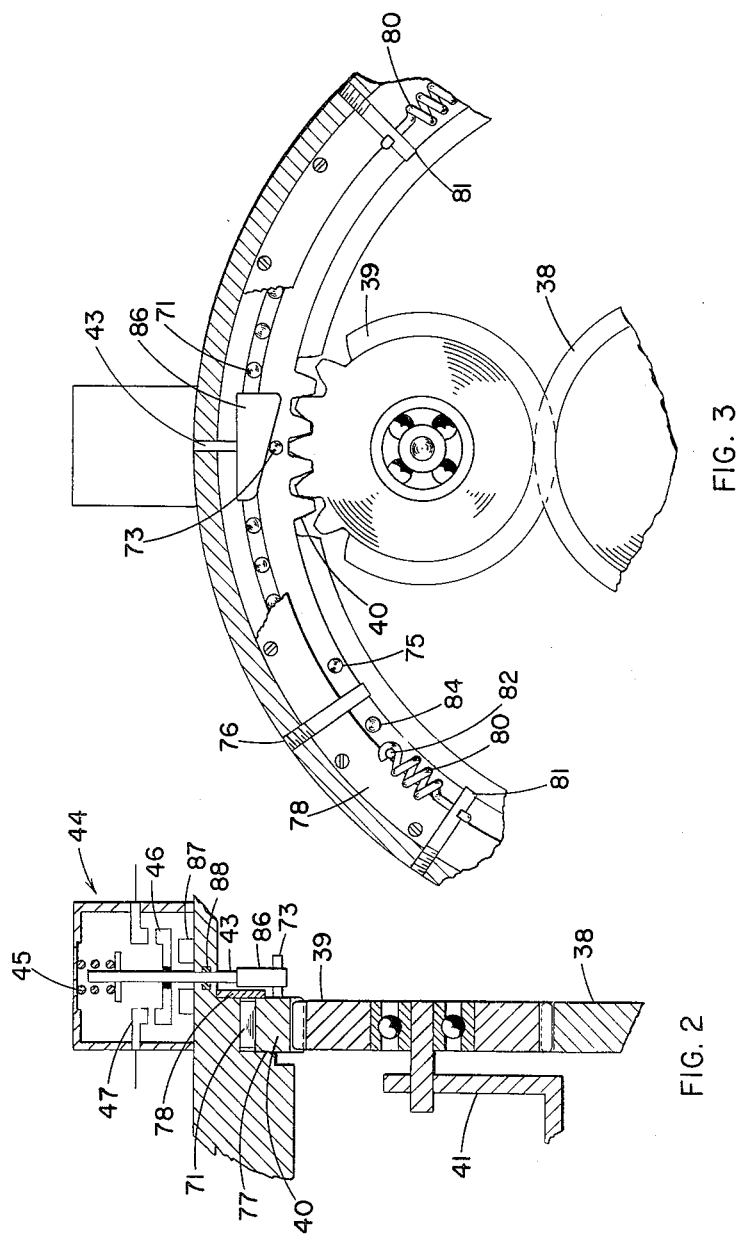

2,999,356
Patented Sept. 12, 1961

2,999,356
COMBUSTION STARTER HAVING TORQUE
SENSING CONTROL
John H. Ferguson, Jr., Saquoit, N.Y., assignor to The
Bendix Corporation, a corporation of Delaware
Filed Feb. 3, 1958, Ser. No. 712,729
5 Claims. (Cl. 60—39.14)

This invention relates to combustion turbine starters and more particularly concerns such starters having a power train and means for connecting the starter output to an aircraft turbine engine but which does not permit the engine to drive the starter.

In such starters, it is possible for the starter turbine to speed up rapidly to self-destruction if there are malfunctions. The malfunctions can be a break in the power train or a failure of the mechanism which couples the starter to the aircraft engine in combination wtih a short-circuiting or a failure of the speed switch which normally cuts off the fuel and air supply when a predetermined starter speed exists. With such malfunctions, the turbine wheel can disintegrate and damage the parts of the aircraft adjacent the starter.

An object of the present invention is the provision in a combustion starter of means which will permit the combustion starting operation only if the starter is engaged to the engine and the power train is intact.

Another object is the provision of particular means for sensing whether or not a starter is fully operative and, if so, for automatically supplying fuel, ignition and air.

An additional object is to provide a starter having a control switch which is actuated by a member arranged to be rotated slightly to fixed position when the starter turbine is transmitting a low driving torque.

A further object is the provision of means for supplying air to the turbine of a combustion starter until the starter is transmitting a predetermined torque to the engine and then automatically supplying combustion gases to the starter turbine.

The achievement of the above objects and the features and advantages of the invention will be apparent from the following detailed description and the accompanying drawing in which:

FIG. 1 is a longitudinal schematic view of a combination starter and control system embodying the invention and shows the starter before engagement with the aircraft engine, FIG. 2 is a longtitudinal cross-sectional view of part of the starter at the location of the upper part of the second stage ring gear and the torque switch where the operativeness of the starter is sensed, and FIG. 3 is a transverse view of the upper part of the starter at the location of the upper part of the second stage ring gear and the torque switch as seen from the right of FIGS. 1 and 2 and shows the cam means for actuating the torque switch and the means for restraining rotation of the ring gear.

Referring to FIG. 1, it can be seen that air or combustion gases from combustion chamber 11 will pass through nozzles 12 and will rotate turbine 13 in a clockwise direction. Turbine 13 connects to a two-stage planetary gear system 15 which transmits torque through a conventional-interleaved clutch pack 17 to an annular spline nut 19. Spline nut 19 has an internal helical spline which mates with an external helical spline on starter screw jaw 21. Upon rotation of spline nut 19, friction buttons 23 which contact the inner surface of screw jaw 21 impose a small frictional drag so that starter jaw 21 advances to the left into engagement with engine jaw 25. Engine jaw 25 transmits torque to the aircraft turbine engine 27 so that it is rotated up to starting speed. After start-up, the engine 27 will tend to drive the starter and will conventionally cause the separation of starter jaw 21 and engine jaw 25 and retraction of the starter jaw, aided by spring 29 which bears against the helical spline of the starter jaw. This conventional jaw advance and retraction construction provides a one-way engaging or coupling mechanism between the starter and the engine. Another one-way coupling which could be used is the conventional unidirectional sprag clutch, such as described in the U.S. Patent #2,473,250.

The speed-reduction planetary gear system 15 is conventional except for the arrangement of the second stage ring gear and includes a first-stage sun gear 32 mounted on the turbine shaft 33 for rotation therewith. Sun gear 32 rotates three circumferentially-stationary planet gears 34 (one being shown) which in turn mesh in ring gear 35 of rotatable member 36. Planet gears 34 are rotatably mounted in three openings in stationary carrier 37. Member 36 is rotatably mounted on the carrier 37 and provides the connection between the first stage and the second stage. At the left end of member 36, a second stage sun gear 38 is formed. Sun gear 38 rotates three second stage planet gears 39 (one of which is shown) which in turn mesh in second-stage ring gear 40. Planet gears 39 are rotatable about their own centers and circumferentially over ring gear 40. The second stage planet carrier 41 is thus rotated by the planet gears 39 and also serves as a clutch barrel for clutch pack 17. As will be described in more detail with reference to FIGS. 2 and 3, the normally stationary second stage ring gear 40 is arranged to rotate about 5 degrees when the starter begins to rotate the engine before it becomes a conventional stationary ring gear. Upon such rotation of ring gear 40, a pin 73 on this ring gear is arranged to contact a cam-plunger 43 of normally-open torque switch 44 so that switch 44 is closed. Torque switch 44 includes a spring 45 arranged to bias its contact arm 46 which is insulated from the plunger away from stationary contacts 47.

The second stage ring gear 40 is rotated and hence closes torque switch 44 when torque is being transmitted to the engine as occurs when the power train is intact and the one-way coupling mechanism operates properly. In order to determine the operativeness of the starter in transmitting torque to the engine, the starter is first operated on air only. For this purpose, air is supplied to turbine 13 by closing start switch 51 and thus connecting battery 52 through speed-switch 53 and wire 54 to the solenoid 55 of the air valve 56 so that the solenoid is energized and opens the normally-closed air valve 56, providing air to air nozzle 57. The air supply is regulated to about 250 p.s.i.g. while the air at turbine 13 is about 50 p.s.i.g. and is customarily obtained from an air tank (not shown).

Upon the closing of the torque switch 44 when the starter is operative, electricity is provided through wire 60 for energizing the solenoid 61 of the normally-closed fuel valve 62 which is connected to a pressurized fuel supply and the igniter 63. Thus, spark and a fuel spray from fuel nozzle 64 are provided in combustion chamber 11. The combustion chamber also continues to receive air since the torque switch 44 does not interrupt the electrical circuit to the air valve 56. In this manner, combustion gases are automatically provided for the turbine when torque switch 44 is closed and the normal combustion start, with power for normal starting loads, results after safe operativeness of the starter is determined.

Speed switch 53 is a conventional centrifugally-actuated switch and is operatively connected to the second stage planet carrier 41 as indicated by the dashed line. Switch 53 serves to cut off air, fuel and spark when starting speed is reached. Other controls (not shown)

prevent re-energizing or reclosing of the speed switch until the start switch 51 is opened.

In the showing in FIGS. 2 and 3, the ring gear 40 is rotated clockwise on roller bearings 71 about half of its limited travel so that axially-projecting cam pin 73 has urged the cam-plunger 43 upwardly about half its travel in a direction tending to close torque switch 44. At this stage, torque is being transmitted to the engine. The gear 40 will rotate until axially-projecting limit pin 84 abuts radially-extending stop post 76 which occurs after five degrees of rotation. Cam pin 73 and limit pin 84 are screwed into the side of the ring gear while post 76 is threaded into the starter housing. Ring gear 40 and bearings 71 are axially confined by a shoulder 77 of the housing and ring 78 attached to the housing.

The ring gear 40 is restrained from rotation by a plurality of springs 80 which are anchored at one end to radially-projecting spring posts 81 screwed into the stationary starter housing. The other end of the springs 80 are conencted to the ring gear by means of axially-extending pins 82 screwed into the side of the ring gear 40. The sum of the restraining forces exerted by the springs 80 counteracts the driving torque of the starter and equals a value appreciably less than (preferably half) the limited driving torque of the starter when operating on air only. With this arrangement, an appreciable predetermined but relatively low torque must be transmitted before torque switch 44 is operated which assures that full engagement has been made and that the power train is safely intact.

Springs 80 also reposition the ring gear 40 counter-clockwise until post 76 is against the other limit pin 75 after the starting cycle so that means for sensing the transmission of appreciable torque are provided for the next start. The cam 86 at the bottom of the plunger 43 is inclined about seventy degrees inwardly from a radial line through its center as seen in FIG. 3 so that slightly less than five degrees rotation of the ring gear 40 will effect the eighth of an inch of travel required for contacts 46. Cam 86 is of such length that when ring gear 40 abuts stop pin 75 the cam pin 73 will be under cam 86 and slightly spaced therefrom. Cam 86 will also extend beyond the cam pin 73 when ring gear 40 abuts limit pin 84. Spring 45 of the torque switch 44 normally urges the bottom of the contact 46 of plunger 43 downwardly against the collar stop 87 so that an eighth of an inch of travel is provided. An O-ring oil seal 88 is provided in side surface of the plunger to prevent oil from reaching the switch 44. From the foregoing, it is apparent that means for sensing torque from a limited-rotatable member of the gear train has been provided and is arranged to initiate the combustion start.

In operation, start switch 51 is closed, opening air valve 56, and the starter is air-motored or develops torque on air only until the force at the ring gear 40 is sufficient to overcome the restraint of the springs 80 and to rotate in a clockwise direction fully the ring gear 40. This force will not develop if the planetary gear train or reduction gearing 15 is not intact or if the starter jaw 21 is not operably engaged with the engine jaw 25. With the turbine design and the air pressure involved and in the event torque is not transmitted, the air-motored starter turbine 13 cannot reach destructive speed but will rotate at safe speeds without starting the aircraft engine 27 until the start switch 51 is opened or the air supply is exhausted. Rotation of ring gear 40, due to the clockwise torque of the second stage planets 39 when the starter is transmitting torque, causes cam pin 73 to move the cam-plunger 43 upward to close torque switch 44. This action automatically energizes the solenoid of the fuel valve 62 and the igniter 63 so that combustion gases rotate the turbine 13 after the operativeness of the starter is established. The starter will then bring the aircraft engine up to starting speed when speed switch 53 cuts off the starter motive power by closing air valve 56 and fuel valve 62. When the engine has started, the starter will be disengaged or uncoupled and the starter jaw 21 will be retracted. Thereafter, springs 80 will rotate ring gear 40 and cause limit pin 75 to move into abutment with stop post 76. Cam pin 73 also moves with the ring gear 40 and permits torque switch 44 to open due to spring 45 urging cam-plunger 43 down against stop collar 87. From the foregoing, it is apparent that a torque-sensing control means has been provided which automatically gives a combustion start only when the starter is transmitting torque whereby the hazard of a run-away turbine is avoided.

It is to be understood that persons skilled in the art can make changes in the embodiment of the invention herein set forth without departing from the invention as set forth in the appended claims.

What is claimed is:

1. A combustion starter comprised of a combustion chamber having an igniter, fuel supply means and air supply means, a turbine arranged to be driven by gases from said chamber and operably connected by a two-stage planetary gearing and coupling means to drive an aircraft turbine engine, said air supply means including a source of pressurized air and being arranged to air-motor the starter so that an appreciable driving torque is transmitted through the starter, control means arranged to sense when the starter is transmitting torque of a pre-determined low value, said control means when sensing said torque being arranged to energize said igniter and to operate said fuel supply means and further permit the supply of air from said air supply means so that combustion gases are automatically supplied to said turbine only when the starter is transmitting said predetermined torque, said planetary gearing including a second stage ring gear arranged for limited rotation when the starter is transmitting said predetermined torque, said ring gear when rotated being arranged to actuate said control means and means connected to said ring gear arranged to return said ring gear to its initial position whereby said control means is de-actuated.

2. A combustion starter comprised of a combustion chamber having an igniter, a fuel nozzle and an air nozzle, a turbine arranged to be driven by gases from said combustion chamber, said turbine being operably connected to a two-stage planetary gear system which has a second stage ring gear, a one-way engaging mechanism operably connected to said planetary gear system for coupling the starter to an aircraft turbine engine, fuel supply means including a solenoid valve connected to said fuel nozzle, air supply means including a source of pressurized air and an air solenoid valve connected to said air nozzle, said fuel valve and said air valve being normally closed, electrical means including a normally-open start switch arranged to open said air valve so that said turbine can be driven by air and a limited torque can be transmitted through the starter, said second stage ring gear being rotatably mounted for limited rotation, spring means arranged to restrain rotation of said second-stage ring gear until an appreciable amount of said limited torque is being transmitted by the starter, said second stage ring gear being arranged to close a normally-open torque switch, said torque switch being electrically connected to said igniter and the solenoid of said fuel valve so that electrical spark and fuel are supplied to said combustion chamber whereby said starter is air-motored, until said starter is transmitting appreciable torque through said planetary gear system and said one-way engaging mechanism, when said torque switch automatically provides a combustion starting cycle.

3. A combustion starter comprised of a combustion chamber having an igniter, a fuel nozzle and an air nozzle, a turbine arranged to be driven by gases from said combustion chamber, said turbine being operably connected to a two-stage planetary gear system which has a second stage ring gear, a one-way engaging mechanism operably connected to said planetary gear system for coupling the starter to an aircraft turbine engine, fuel supply means including a solenoid valve connected to said fuel nozzle, air supply means including a source of pressurized air and an air solenoid valve connected to said air nozzle, said fuel valve and said air valve being normally closed, electrical means including a normally-open start switch arranged to open said air valve so that said turbine can be driven by air and a limited torque can be transmitted through the starter, said second stage ring gear being rotatably mounted for limited rotation, two spaced pins axially projecting from said ring gear and cooperating with a fixed radially-projecting stop post for effecting said limited rotation, spring means arranged to restrain rotation of said second-stage ring gear until an appreciable amount of said limited torque is being transmitted by the starter, said spring means including a plurality of coil springs paralleling a side of said ring gear, said second-stage ring gear being arranged to operate a normally-open torque switch, said ring gear having an axially-projecting cam pin cooperating with cammed radially-extending plunger of said torque switch for effecting said torque switch operation, said torque switch being electrically connected to said igniter and said fuel valve so that electrical spark and fuel are supplied to said combustion chamber whereby said starter is air-motored, until said starter is transmitting said appreciable torque through said planetary gear system and said one-way engaging mechanism, when said torque switch automatically provides a combustion starting cycle.

4. In a starter, a member arranged to be rotated slightly to a fixed position when the starter is transmitting a low-but-appreciable driving torque, low-power motoring means connected to said member, said low-power-motoring means including a turbine, spring means arranged to oppose rotation of said member below a predetermined torque, control means having a cam arranged to be operated by said member when said member is rotated, starting-power means operable by said control means for fully-energizing said starter, said starting-power means including said turbine, said control means including an electrical switch arranged to be operated by cam action when said member is rotated, and electric means including a start switch arranged to operate said low-power motoring means and to provide current to said control means.

5. In a combustion starter, a planetary gear system having a ring gear member arranged to be rotated slightly to a fixed position when the gear system is transmitting a low-but-appreciable driving torque, low-power motoring means including a turbine operably connected to said system, spring means arranged to oppose rotation of said ring gear member below a predetermined torque, control means having a cam arranged to be operated by said ring gear member when said ring gear member is rotated, starting-power means including said turbine and a combustion chamber, said starting-power means being operable by said control means for fully-energizing said starter, said starting-power means when operated being arranged to provide fuel, air and electrical spark to said combustion chamber, said turbine being operably associated with said combustion chamber so that combustion gases therefrom drive said turbine, said control means including an electrical switch arranged to be operated by cam action when said ring gear member is rotated, said low-power motoring means and said starting-power means having a common air source, and electric means including a start switch arranged to operate said low-power motoring means and to provide current to said control means.

References Cited in the file of this patent

UNITED STATES PATENTS

| | | |
|---|---|---|
| 2,558,840 | Gordon | July 3, 1951 |
| 2,721,482 | Shank et al. | Oct. 25, 1955 |
| 2,742,757 | Jaquith | Apr. 24, 1956 |
| 2,752,023 | Cain et al. | June 26, 1956 |
| 2,764,272 | Reynolds | Sept. 25, 1956 |
| 2,842,937 | Clark | July 15, 1958 |

FOREIGN PATENTS

| | | |
|---|---|---|
| 499,914 | Canada | Feb. 9, 1954 |